US010232480B2

(12) United States Patent
Morita et al.

(10) Patent No.: US 10,232,480 B2
(45) Date of Patent: Mar. 19, 2019

(54) NUMERICAL CONTROLLER OF MACHINE TOOL

(71) Applicant: FANUC CORPORATION, Yamanashi (JP)

(72) Inventors: Yuuki Morita, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/792,834

(22) Filed: Oct. 25, 2017

(65) Prior Publication Data

US 2018/0117724 A1 May 3, 2018

(30) Foreign Application Priority Data

Oct. 31, 2016 (JP) .................. 2016-213150

(51) Int. Cl.
G05B 19/25 (2006.01)
B23Q 15/02 (2006.01)
F16C 32/04 (2006.01)
G05B 19/18 (2006.01)
G05B 19/35 (2006.01)
G05B 19/416 (2006.01)

(52) U.S. Cl.
CPC .......... *B23Q 15/02* (2013.01); *F16C 32/0402* (2013.01); *F16C 32/0489* (2013.01); *G05B 19/186* (2013.01); *G05B 19/353* (2013.01); *G05B 19/4166* (2013.01); *F16C 2322/39* (2013.01); *G05B 2219/37285* (2013.01)

(58) Field of Classification Search
CPC .......... G05B 2219/49077; G05B 2219/37285; G05B 19/4153; G05B 19/4166
See application file for complete search history.

(56) References Cited

U.S. PATENT DOCUMENTS 5,404,308 A 4/1995 Kajiyama
6,252,367 B1 * 6/2001 Sakamoto .............. G05B 19/39
318/560

FOREIGN PATENT DOCUMENTS

| JP | H05-069275 A | 3/1993 |
| JP | H11-202926 A | 7/1999 |
| JP | 2000-263377 A | 9/2000 |
| JP | 2002-186295 A | 6/2002 |
| JP | 2013-056392 | 3/2013 |
| JP | 2013-063017 A | 4/2013 |

OTHER PUBLICATIONS

Notification of Reasons for Refusal issued to JP Patent Application No. 2016-213150, dated Feb. 27, 2018.

* cited by examiner

*Primary Examiner* — Karen Masih
(74) *Attorney, Agent, or Firm* — Studebaker & Brackett PC

(57) ABSTRACT

A controller of a machine tool capable of suppressing heat generation and realizing a stable cutting operation during deep cutting is provided. A numerical controller for controlling a machine tool including a spindle motor formed of an induction motor and a feed axis driving motor includes: a magnetic flux amount acquisition means that acquires a present magnetic flux amount of the spindle motor; and a speed change means that changes a speed of the feed axis driving motor on the basis of the magnetic flux amount.

5 Claims, 7 Drawing Sheets

NUMERICAL CONTROLLER OF MACHINE TOOL

This application is based on and claims the benefit of priority from Japanese Patent Application No. 2016-213150, filed on 31 Oct. 2016, the content of which is incorporated herein by reference.

BACKGROUND OF THE INVENTION

Field of the Invention

The present invention relates to a numerical controller of a machine tool including a spindle motor formed of an induction motor and a feed axis driving motor.

Related Art

When a work is machined using a machine tool having a spindle and a feed axis, the movement of the spindle is relatively often interlocked with the movement of the feed axis. In such a case, in a general numerical controller that controls a machine tool, a feed axis is controlled using a characteristic value or a measurement value associated with the spindle, or the spindle is controlled using a characteristic value or a measurement value associated with the feed axis.

For example, Patent Document 1 discloses a technique of controlling a feed rate using data corrected using a change in number of revolutions of a spindle motor in order to enable high-accuracy machining even when the actual speed of the spindle motor used as a spindle motor varies abruptly.

Patent Document 2 discloses a technique of controlling a feed rate of machining feeding means so that a load current value of a motor during machining is equal to or smaller than a maximum load current value corresponding to a desired flatness in order to machine a machining target such as a semiconductor wafer in a desired flatness by one machining operation.

Patent Document 3 discloses a technique of detecting an excitation current of a static pressure magnetic composite bearing in order to detect a machining state of a mold.

Patent Document 1: Japanese Unexamined Patent Application, Publication No. H05-69275

Patent Document 2: Japanese Unexamined Patent Application, Publication No. 2013-56392

Patent Document 3: Japanese Unexamined Patent Application, Publication No. 2000-263377

SUMMARY OF THE INVENTION

An induction motor is sometimes used as a spindle motor of a machine tool. Here, an induction motor is a motor that causes an excitation current to flow into a stator coil to generate a rotating magnetic field and generate an induction current in a rotor so that the rotor rotates with the electromagnetic force so as to follow the rotation of the rotating magnetic field. The induction motor has a drawback that heat is generated when an excitation current flows into the stator coil. In order to avoid this drawback, a technique of weakening a magnetic flux or an excitation current of a rotating magnetic field when a load on the induction motor is light and a high torque is not required may be used. However, when this technique is used, if a feed axis driving motor starts a deep cutting operation (a cutting operation which involves a large cutting resistance) which applies a heavy load to a spindle motor in a state in which a torque is decreased due to a weakened magnetic flux of the induction motor which is a spindle motor, the spindle speed may decrease greatly or the spindle may stop due to an abrupt variation of the load at the start of the cutting operation.

In this respect, Patent Documents 1 and 2 do not aim to suppress heat generation and prevent a decrease in the spindle speed or stopping of the spindle. Moreover, in Patent Document 3, the detected excitation current value is merely used for detecting the machining state.

Therefore, an object of the present invention is to provide a numerical controller of a machine tool, capable of suppressing heat generation and realizing a stable cutting operation during deep cutting.

(1) A numerical controller (for example, a numerical controller 100, 200 to be described later) of a machine tool according to the present invention is a numerical controller for controlling a machine tool (for example, a machine tool 150 to be described later) including a spindle motor (for example, an induction motor 125 to be described later) formed of an induction motor and a feed axis driving motor (for example, a servo motor 145 to be described later), the numerical controller including: a magnetic flux amount acquisition means (for example, a magnetic flux amount acquisition means 102 to be described later) that acquires a present magnetic flux amount of the spindle motor; and a speed change means (for example, a speed change means 103 to be described later) that changes a speed of the feed axis driving motor on the basis of the magnetic flux amount.

(2) In the numerical controller according to (1), the magnetic flux amount acquisition means (for example, a magnetic flux amount acquisition means 102 to be described later) may estimate a present magnetic flux amount of the spindle motor (for example, an induction motor 125 to be described later) and acquire the estimated magnetic flux amount as the present magnetic flux amount.

(3) In the numerical controller according to (1) or (2), the speed change means (for example, a speed change means 103 to be described later) may change the speed of the feed axis driving motor (for example, a servo motor 145 to be described later) on the basis of a magnetic flux amount ratio which is the ratio of the present magnetic flux amount to a maximum magnetic flux amount.

(4) The numerical controller (for example, a numerical controller 100, 200 to be described later) according to (3) may further include: a ratio calculation means (for example, a ratio calculation means 104 to be described later) that receives the present magnetic flux amount from the magnetic flux amount acquisition means (for example, a magnetic flux amount acquisition means 102 to be described later) and calculates the magnetic flux amount ratio; and a ratio notification means (for example, a ratio notification means 105 to be described later) that notifies the speed change means (for example, a speed change means 103 to be described later) of the magnetic flux amount ratio calculated by the ratio calculation means.

(5) In the numerical controller (for example, a numerical controller 100, 200 to be described later) according to (3) or (4), the numerical controller may generate a feed rate command value by executing a machining program, and the speed change means (for example, a speed change means 103 to be described later) may determine a feed rate value by multiplying the magnetic flux amount ratio by the feed rate command value and change the speed of the feed axis driving motor on the basis of the feed rate value.

According to the present invention, it is possible to provide a numerical controller of a machine tool, capable of suppressing heat generation and realizing a stable cutting operation during deep cutting.

DETAILED DESCRIPTION OF THE INVENTION

First Embodiment

Figure 1:
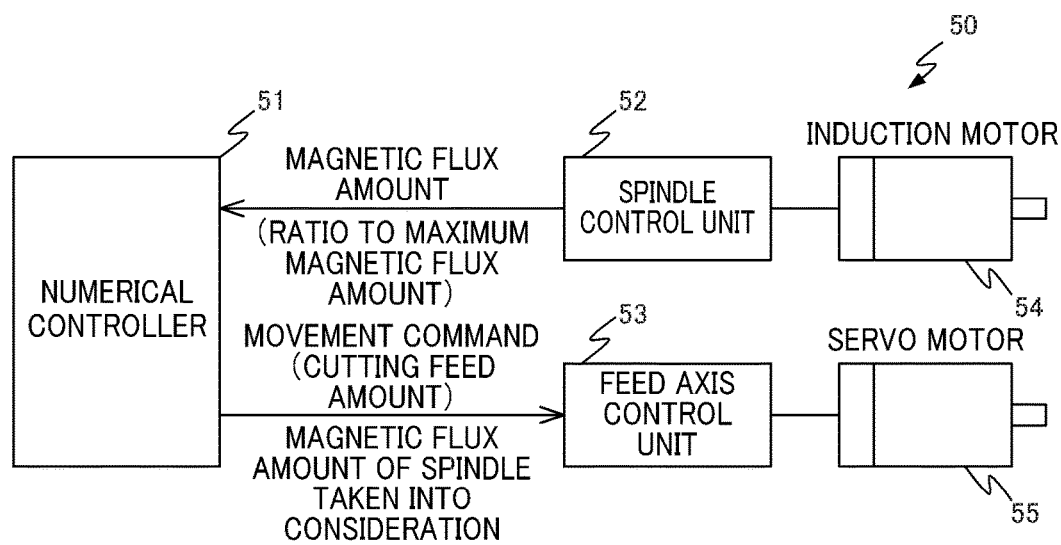
FIG. 1 is a conceptual diagram of the present invention.

Hereinafter, a first embodiment of the present invention will be described in detail with reference to FIGS. 1 to 4. FIG. 1 is a diagram illustrating a basic concept of the present invention. Here, a control system 50 includes a numerical controller 51, a spindle control unit 52, a feed axis control unit 53, an induction motor 54 as a spindle motor, and a servo motor 55 as a feed axis driving motor. Moreover, the numerical controller 51 controls the induction motor 54 with the aid of the spindle control unit 52 and controls the servo motor 55 with the aid of the feed axis control unit 53.

When an induction motor is used as a spindle motor, unless the magnetic flux amount generated is increased gradually as the load increases, the induction motor cannot exhibit its maximum performance. In this respect, as described above, if a deep cutting operation starts in a state in which the magnetic flux of the induction motor 54 is weak, the spindle speed may decrease greatly or the spindle may stop due to an abrupt variation of the load at the start of the cutting operation. The spindle control unit 52 acquires the magnetic flux amount of the induction motor 54. The spindle control unit 52 transmits this magnetic flux amount, or as another example, the ratio (hereinafter also referred to as a "magnetic flux amount ratio") of a present magnetic flux amount to the maximum magnetic flux amount of the induction motor 54 to the numerical controller 51. The numerical controller 51 transmits a movement command (a cutting feed amount) to the feed axis control unit 53 by taking this magnetic flux amount data or the magnetic flux amount ratio into consideration. The feed axis control unit 53 controls the servo motor 55 according to the movement command (the cutting feed amount) received from the numerical controller 51.

As described above, although the magnetic flux amount or the magnetic flux amount ratio is transmitted from the spindle control unit 52 to the numerical controller 51, the spindle control unit 52 and the numerical controller 51 perform bidirectional communication every predetermined cycle in reality. Due to this, during this communication, the magnetic flux amount or the magnetic flux amount ratio may be delivered from the spindle control unit 52 to the numerical controller 51.

Figure 2:
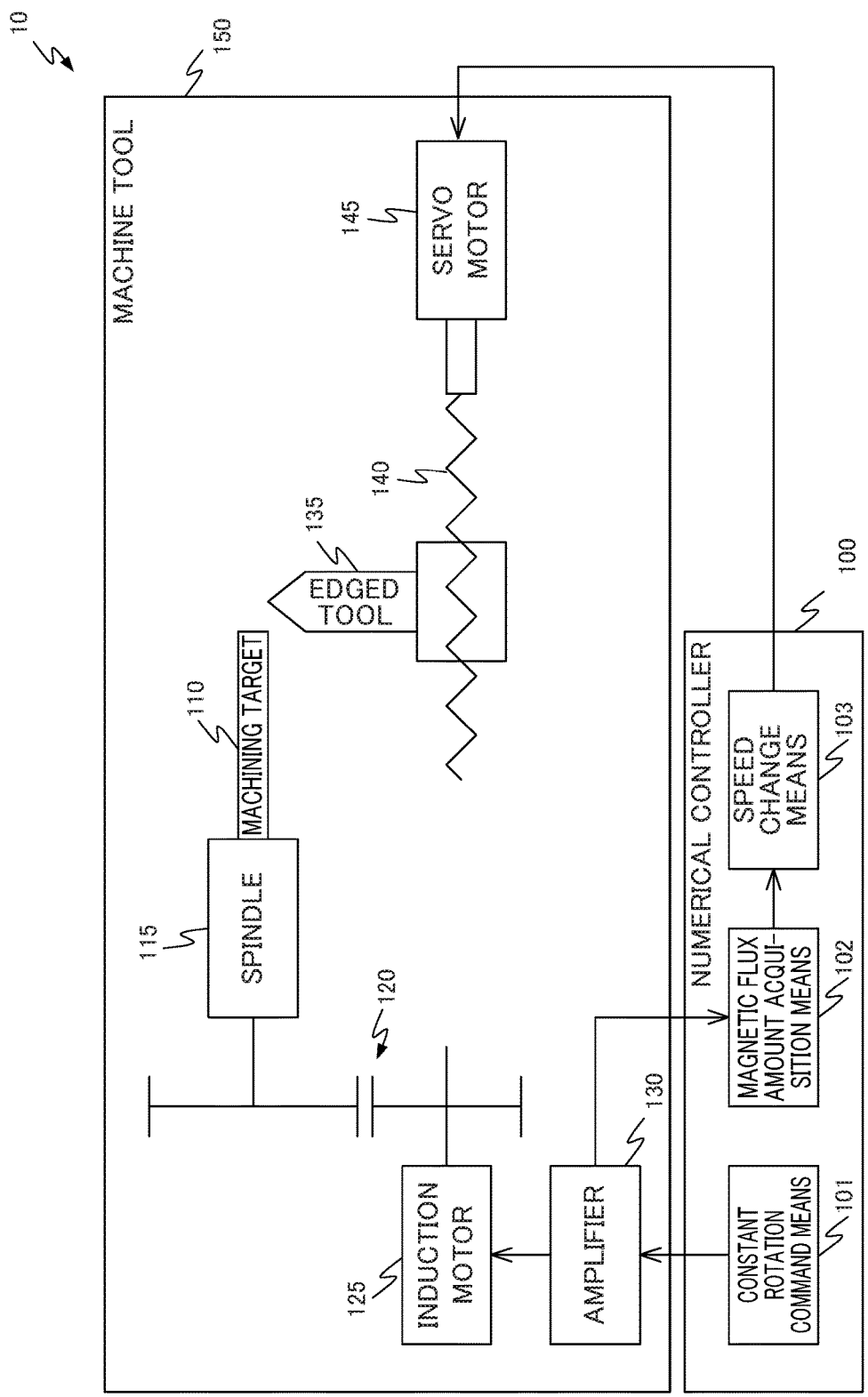
FIG. 2 is a diagram illustrating a configuration of a control system according to a first embodiment of the present invention.

FIG. 2 illustrates a configuration example of a numerical control system 10 according to the first embodiment. The numerical control system 10 includes a numerical controller 100 and a machine tool 150. The machine tool 150 includes a spindle 115 to which a machining target 110 is attached, a speed change gear 120, an induction motor 125 as the spindle motor that rotates the spindle 115 with the aid of the speed change gear 120, an amplifier 130 that outputs a driving current of the induction motor 125, an edged tool 135 that cuts the machining target 110, a ball screw 140 that moves the edged tool 135 in an axial direction, and a servo motor 145 that rotates the ball screw 140 as a feed axis driving motor.

The numerical controller 100 controls the induction motor 125 and the servo motor 145 so that the edged tool 135 that moves with rotation of the ball screw 140 performs desired cutting machining with respect to the machining target 110 attached to the spindle 115 that rotates with rotation of the induction motor 125. Specifically, the numerical controller 100 includes a constant rotation command means 101 that inputs a constant rotation command signal to the amplifier 130, a magnetic flux amount acquisition means 102 that acquires a present magnetic flux amount of the induction motor 125 from the amplifier 130, and a speed change means 103 that changes the speed of the servo motor 145 on the basis of the present magnetic flux amount. In the case of a motor of which the shaft rotates, the speed is a rotation speed. Here, although not illustrated in the drawing, the numerical controller 100 may include the same constituent elements and functions as those of an ordinary numerical controller.

The motor is not limited to a motor of which the shaft rotates but may be a linear motor. In the case of a linear motor, the speed is a linear or curved speed. The amplifier 130 in FIG. 2 corresponds to the spindle control unit 52 in FIG. 1. Moreover, the speed change means 103 in FIG. 2 corresponds to the feed axis control unit 53 in FIG. 1.

Figure 3:
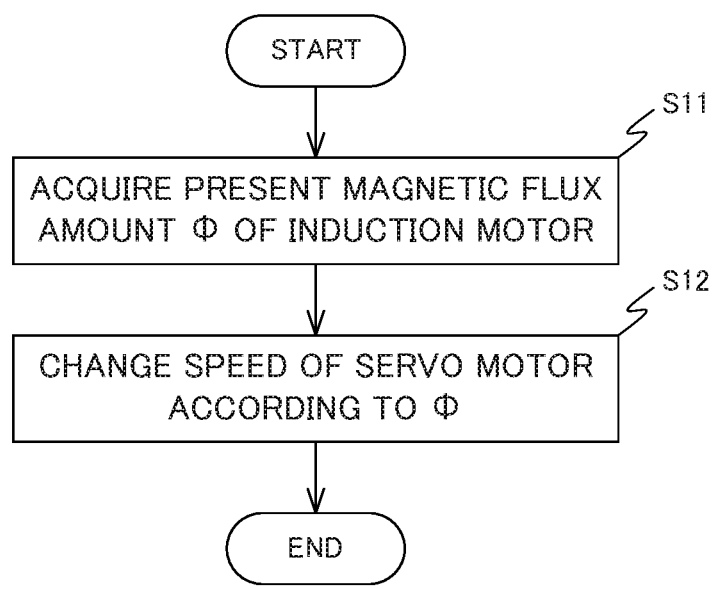
FIG. 3 is a diagram illustrating an operation of the control system according to the first embodiment of the present invention.

FIG. 3 illustrates an operation of the numerical control system 10 according to the first embodiment. In step S11, the magnetic flux amount acquisition means 102 acquires the present magnetic flux amount Φ of the induction motor 125 from the amplifier 130.

In step S12, the speed change means 103 changes the rotation speed of the servo motor 145 according to the present magnetic flux amount Φ of the induction motor 125 acquired by the magnetic flux amount acquisition means 102. Specifically, the rotation speed of the servo motor 145 is increased when the present magnetic flux amount Φ is large. On the other hand, the rotation speed of the servo motor 145 is decreased when the present magnetic flux amount Φ is small. Since the feed rate of the ball screw 140 which is a feed axis is the product of the rotation speed of the servo motor 145 and the pitch width of the ball screw 140, the feed rate of the feed axis is changed when the rotation speed of the servo motor 145 is changed.

The magnetic flux amount acquisition means 102 may acquire the present magnetic flux amount Φ of the induction motor 125 directly from the induction motor 125 or may detect the present magnetic flux amount Φ. Alternatively, for example, the present magnetic flux amount Φ may be estimated according to an excitation current amount or the like of the induction motor 125. Here, an example of an estimation method will be described with reference to FIG. 4.

Figure 4:
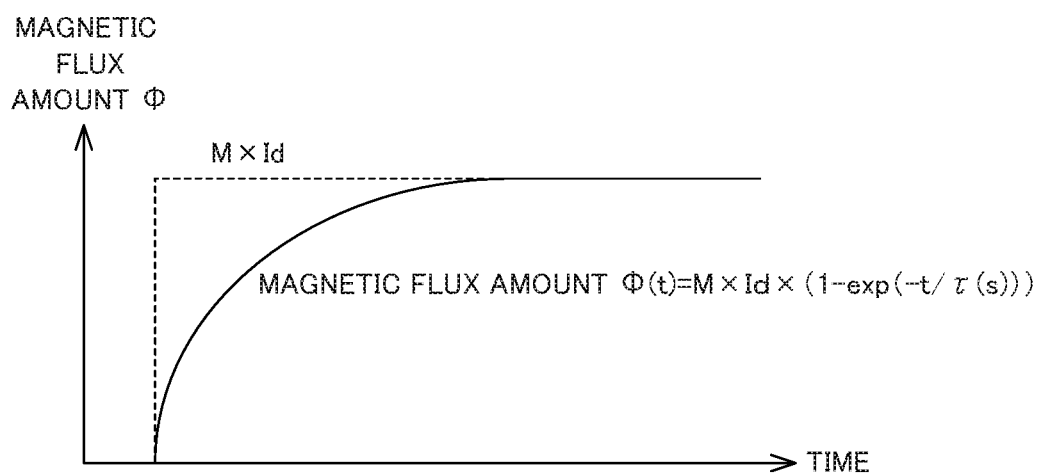
FIG. 4 is an explanatory diagram of a method of estimating a magnetic flux amount according to the present invention.

The magnetic flux amount Φ of the induction motor is proportional to the product of the excitation current (Id) for creating a magnetic flux and the mutual inductance M of the induction motor. Although the numerical controller of an induction motor changes the excitation current according to a target magnetic flux amount, the actual magnetic flux shows a response of a primary delay having a time constant τ(s) in relation to a change in the excitation current. When a constant excitation current Id is supplied continuously from a state of the excitation current Id=0 and the magnetic flux amount Φ=0, the magnetic flux amount Φ(t) after the elapse of t (sec) is estimated as the following equation as illustrated in FIG. 4.

$$\Phi(t)=M\times Id\times(1-\exp(-t/\tau(s)))$$

In actual calculation, a command value of an excitation current or a feedback value is used as the excitation current Id, and an output obtained by applying a primary low-pass filter having the time constant τ to M×Id obtained every control cycle is used as an estimated magnetic flux value.

[Advantages of First Embodiment]

In the numerical control system 10 according to the first embodiment, by changing the feed rate according to the magnetic flux amount of the induction motor, it is possible to suppress heat generation and to realize a stable cutting operation during deep cutting. Specifically, a case in which the technique is used of weakening a magnetic flux or an excitation current of a rotating magnetic field when a load on the induction motor is light and a high torque is not required in order to avoid the drawback that heat is generated when an excitation current flows into the stator coil of an induction motor will be considered. In this case, if a feed axis driving motor starts a deep cutting operation (a cutting operation which involves a large cutting resistance) which applies a heavy load to a spindle motor in a state in which a torque is decreased due to a weakened magnetic flux of the induction motor which is a spindle motor, the load at the start of the cutting operation varies abruptly. However, in the present embodiment, when the present magnetic flux amount Φ is small, the speed of the servo motor 145 is decreased. When the speed of the servo motor 145 is small, the cutting resistance is relatively small. Due to this, when the present magnetic flux amount Φ is small, it is possible to prevent a heavy load from being applied to the spindle motor and to realize a stable cutting operation during deep cutting.

Second Embodiment

Hereinafter, a second embodiment of the present invention will be described with reference to FIG. 5. A control system 20 according to the second embodiment basically has the same configuration as the numerical control system 10 according to the first embodiment, and the illustration thereof will be omitted. However, unlike the first embodiment, the numerical controller 100 further includes a ratio calculation means 104 (not illustrated) in addition to the constant rotation command means 101, the magnetic flux amount acquisition means 102, and the speed change means 103.

The ratio calculation means 104 calculates the ratio of the present magnetic flux amount Φ acquired by the magnetic flux amount acquisition means 102 to the maximum magnetic flux amount Φmax of the induction motor 125. Furthermore, the ratio calculation means 104 transmits the calculated magnetic flux amount ratio to the speed change means 103, and the speed change means 103 changes the rotation speed of the servo motor 145 on the basis of the magnetic flux amount ratio. Since the feed rate of the feed axis is the product of the rotation speed of the servo motor 145 and the pitch width of the ball screw 140, the feed rate of the feed axis changes when the rotation speed is changed.

Figure 5:
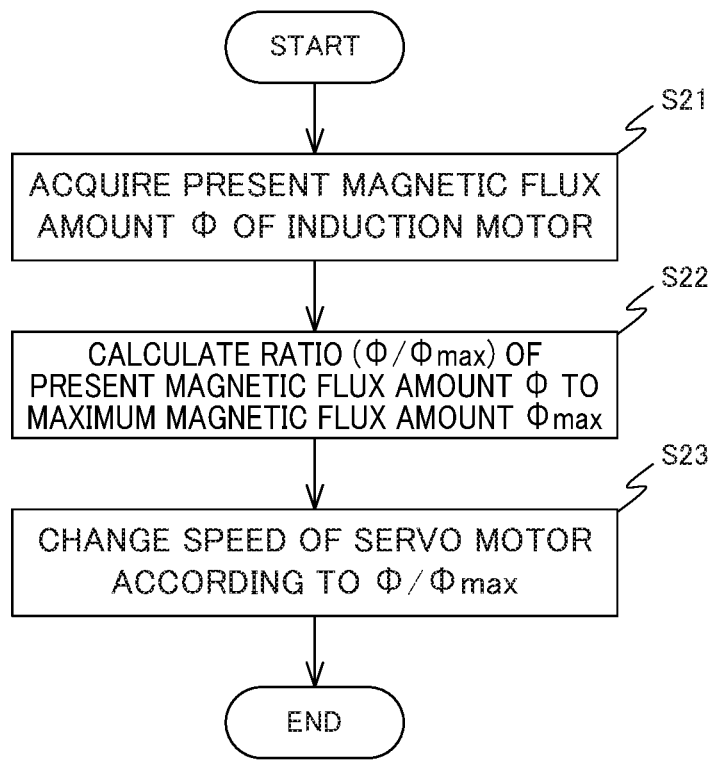
FIG. 5 is a diagram illustrating an operation of a control system according to a second embodiment of the present invention.

FIG. 5 illustrates the operation of the numerical control system 20 according to the second embodiment. In step S21, the magnetic flux amount acquisition means 102 acquires the present magnetic flux amount Φ of the induction motor 125 from the amplifier 130.

In step S22, the ratio calculation means 104 calculates the ratio Φ/Φmax (hereinafter also referred to as a magnetic flux amount ratio Φ/Φmax) of the present magnetic flux amount Φ acquired by the magnetic flux amount acquisition means 102 to the maximum magnetic flux amount Φmax of the induction motor 125 and transmits the magnetic flux amount ratio Φ/Φmax to the speed change means 103.

In step S23, the speed change means 103 changes the rotation speed of the servo motor 145 according to the magnetic flux amount ratio Φ/Φmax calculated by the ratio calculation means 104. Specifically, when the rotation speed of the servo motor 145 is increased when the present magnetic flux amount ratio Φ/Φmax is large. On the other hand, the rotation speed of the servo motor 145 is decreased when the present magnetic flux amount ratio Φ/Φmax is small. Since the feed rate of the ball screw 140 which is a feed axis is the product of the rotation speed of the servo motor 145 and the pitch width of the ball screw 140, the feed rate of the feed axis is changed when the rotation speed is changed.

[Advantages of Second Embodiment]

In the numerical control system 20 according to the second embodiment, similarly to the control system 10 according to the first embodiment, by changing the feed rate according to the magnetic flux amount of the induction motor, it is possible to suppress heat generation and to realize a stable cutting operation during deep cutting.

Third Embodiment

Hereinafter, a third embodiment of the present invention will be described with reference to FIGS. 6 and 7.

Figure 6:
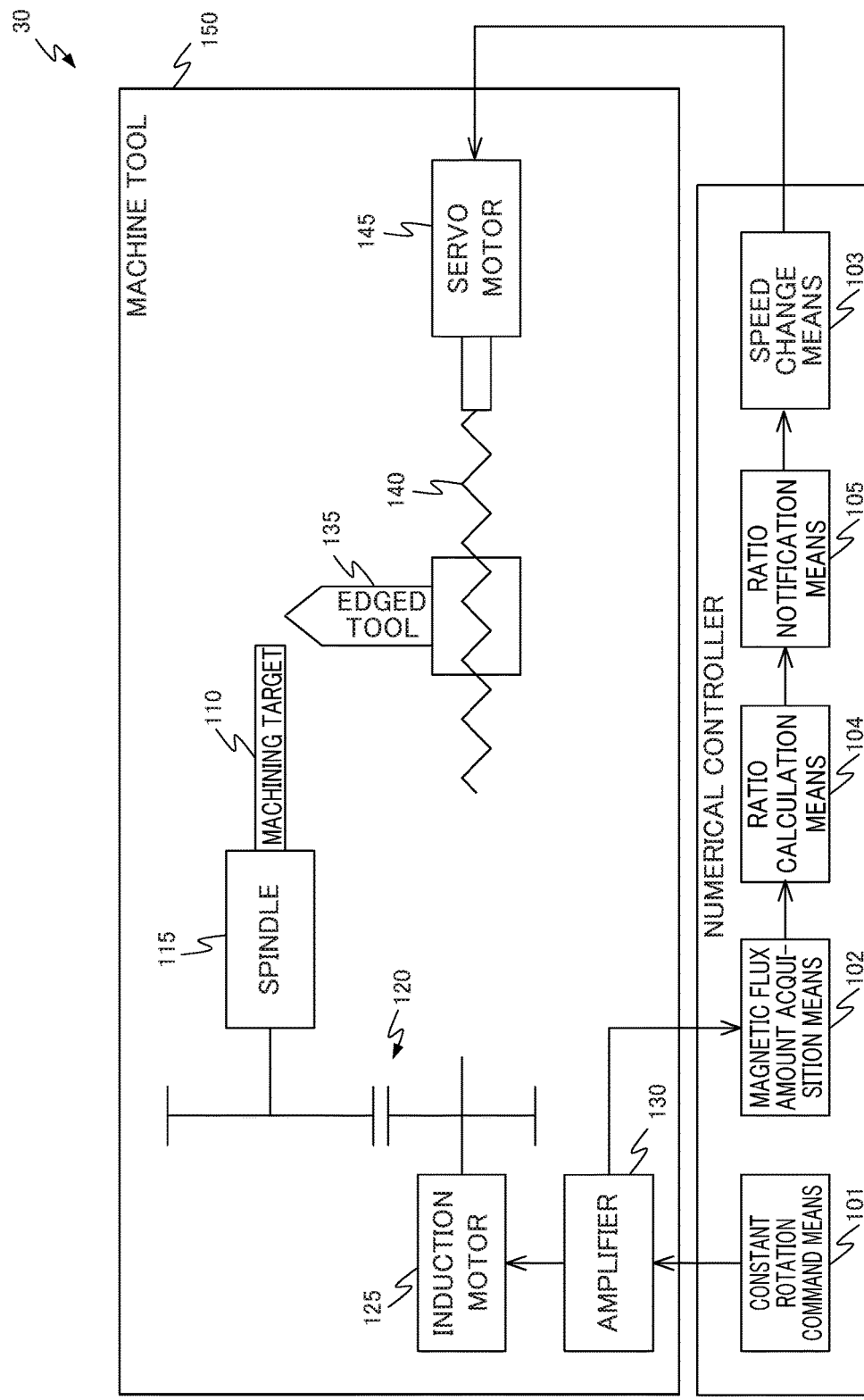
FIG. 6 is a diagram illustrating a configuration of a control system according to a third embodiment of the present invention.

FIG. 6 illustrates a configuration example of a numerical control system 30 according to a third embodiment of the present invention. The same constituent elements as those of the numerical control system 10 according to the first embodiment will be denoted by the same reference numerals, and the description thereof will be omitted.

A control system 30 includes a numerical controller 200 unlike the control system 10 according to the first embodiment. The numerical controller 200 further includes a ratio calculation means 104 and a ratio notification means 105 unlike the numerical controller 100 according to the first embodiment. Similarly to the ratio calculation means 104 of the second embodiment, the ratio calculation means 104 calculates the ratio (the magnetic flux amount ratio Φ/Φmax) of the present magnetic flux amount Φ acquired by the magnetic flux amount acquisition means 102 to the maximum magnetic flux amount Φmax of the induction motor 125. Moreover, the ratio calculation means 104 transmits the calculated magnetic flux amount ratio Φ/Φmax to the ratio notification means 105. The ratio notification means 105 notifies the speed change means 103 of the magnetic flux amount ratio Φ/Φmax received from the ratio calculation means 104. Here, although not illustrated in the drawing, the numerical controller 200 may include the same constituent elements and functions as those of an ordinary numerical controller.

Figure 7:
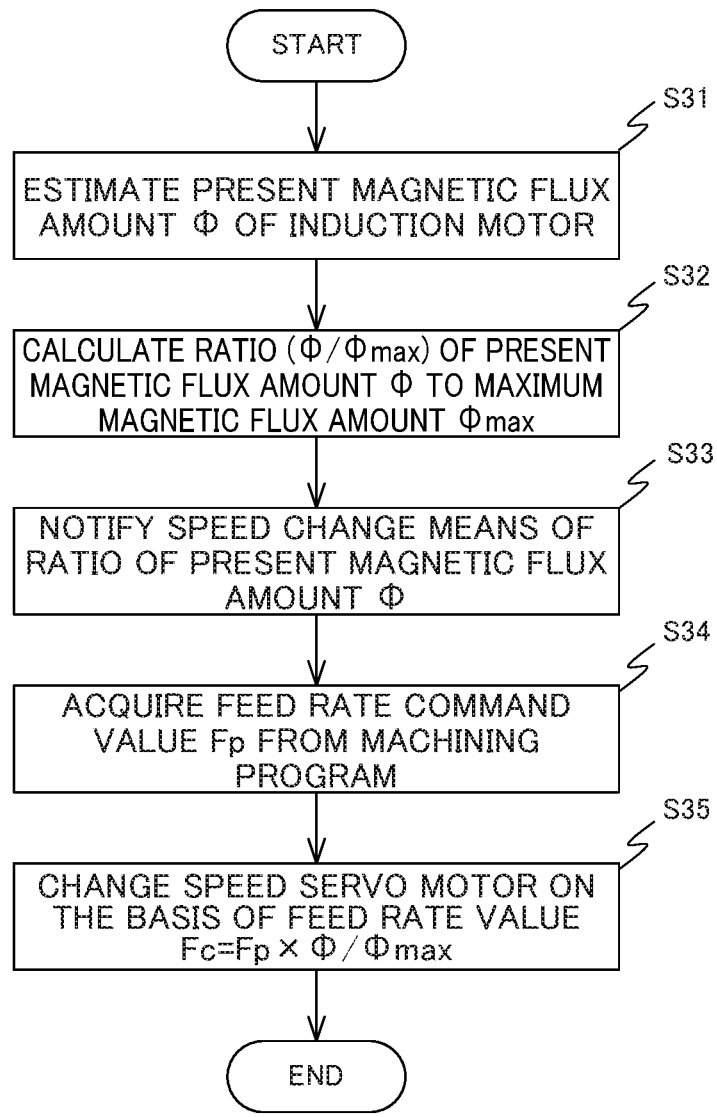
FIG. 7 is a diagram illustrating an operation of the control system according to the third embodiment of the present invention.

FIG. 7 illustrates the operation of the control system 30 according to the third embodiment. In step S31, the magnetic flux amount acquisition means 102 acquires the present magnetic flux amount Φ of the induction motor 125 from the amplifier 130.

In step S32, the ratio calculation means 104 calculates the magnetic flux amount ratio Φ/Φmax acquired by the magnetic flux amount acquisition means 102.

In step S33, the ratio notification means 105 notifies the speed change means 103 of the magnetic flux amount ratio Φ/Φmax calculated by the ratio calculation means 104.

In step S34, the speed change means 103 acquires a feed rate command value Fp from a machining program executed by the numerical controller 200.

In step S35, the speed change means 103 determines a present feed rate value Fc using an equation Fc=Fp×Φ/Φmax and changes the rotation speed of the servo motor 145 on the basis of the feed rate value Fc. Specifically, the rotation speed of the servo motor 145 is increased when the present magnetic flux amount ratio Φ/Φmax is large. On the other hand, the rotation speed of the servo motor 145 is decreased when the present magnetic flux amount ratio Φ/Φmax is small. Since the feed rate of the ball screw 140 which is a feed axis is the product of the rotation speed of the servo motor 145 and the pitch width of the ball screw 140, the feed rate of the feed axis is changed when the rotation speed is changed.

[Advantages of Third Embodiment]

In the control system 30 according to the third embodiment, similarly to the control systems 10 and 20 according to the first and second embodiments, by changing the feed rate according to the magnetic flux amount of the induction motor, it is possible to suppress heat generation and to realize a stable cutting operation during deep cutting.

While embodiments of the present invention have been described, the present invention is not limited to the above-described embodiments. Moreover, the advantages described in the present embodiment are just description of the most preferable advantages generated by the present invention and the advantages of the present disclosure are not limited to those described in the present embodiment.

The control method by the numerical controller 100 or 200 is realized by software. When the control method is realized by software, a program that forms this software is installed in a computer (the numerical controller 100 or 200). Moreover, the program may be recorded on a removable medium and be distributed to a user and may be distributed by being downloaded to the computer of a user via a network. Furthermore, the program may be provided to the computer (the numerical controller 100 or 200) of a user as a web service via a network without being downloaded.

EXPLANATION OF REFERENCE NUMERALS 10, 20, 30: Numerical control system
100, 200: Numerical controller
102: Magnetic flux amount acquisition means
103: Speed change means
104: Ratio calculation means
105: Ratio notification means
125: Induction motor (Spindle motor)
145: Servo motor (Feed axis driving motor)
150: Machine tool

What is claimed is:

1. A numerical controller for controlling a machine tool including a spindle motor formed of an induction motor and a feed axis driving motor, the numerical controller comprising:
    a magnetic flux amount acquisition means that acquires a present magnetic flux amount of the spindle motor; and
    a speed change means that changes a speed of the feed axis driving motor on the basis of the magnetic flux amount.

2. The numerical controller according to claim 1, wherein the magnetic flux amount acquisition means estimates a present magnetic flux amount of the spindle motor and acquires the estimated magnetic flux amount as the present magnetic flux amount.

3. The numerical controller according to claim 1, wherein the speed change means changes the speed of the feed axis driving motor on the basis of a magnetic flux amount ratio which is the ratio of the present magnetic flux amount to a maximum magnetic flux amount.

4. The numerical controller according to claim 3, further comprising:
    a ratio calculation means that receives the present magnetic flux amount from the magnetic flux amount acquisition means and calculates the magnetic flux amount ratio; and
    a ratio notification means that notifies the speed change means of the magnetic flux amount ratio calculated by the ratio calculation means.

5. The numerical controller according to claim 3, wherein the numerical controller generates a feed rate command value by executing a machining program, and
    the speed change means determines a feed rate value by multiplying the magnetic flux amount ratio by the feed rate command value and changes the speed of the feed axis driving motor on the basis of the feed rate value.

* * * * *